:::

(12) United States Patent
Nappa

(10) Patent No.: US 11,056,016 B2
(45) Date of Patent: Jul. 6, 2021

(54) MECHATRONIC FACTORY SIMULATION SYSTEM AND METHOD OF TEACHING HOW TO RESOLVE ERRORS IN AN AUTOMATION-DRIVEN PROCESS

(71) Applicant: John A. Nappa, Medina, NY (US)

(72) Inventor: John A. Nappa, Medina, NY (US)

( * ) Notice: Subject to any disclaimer, the term of this patent is extended or adjusted under 35 U.S.C. 154(b) by 473 days.

(21) Appl. No.: 15/631,991

(22) Filed: Jun. 23, 2017

(65) Prior Publication Data
US 2018/0374379 A1   Dec. 27, 2018

(51) Int. Cl.
| | | |
|---|---|---|
| G09B 9/00 | (2006.01) | |
| G09B 25/02 | (2006.01) | |
| G09B 23/18 | (2006.01) | |
| G09B 19/00 | (2006.01) | |

(52) U.S. Cl.
CPC .......... G09B 9/00 (2013.01); G09B 19/0053 (2013.01); G09B 23/186 (2013.01); G09B 25/02 (2013.01)

(58) Field of Classification Search
USPC ........................................................ 434/366
See application file for complete search history.

(56) References Cited

U.S. PATENT DOCUMENTS

| | | |
|---|---|---|
| 4,657,470 A | 4/1987 | Clarke |
| 5,868,575 A | 2/1999 | Kuczewski |
| 9,502,277 B2 | 11/2016 | Glantschnig et al. |
| 2005/0084831 A1 | 4/2005 | Ison et al. |
| 2005/0222696 A1 | 10/2005 | Ozaki et al. |

*Primary Examiner* — Kesha Frisby
(74) *Attorney, Agent, or Firm* — Vincent G. LoTempio

(57) ABSTRACT

A mechatronic training and simulation system and method of detecting and resolving complex control system errors in automation-driven process that replicates a scaled factory. The system provides student work stations that allow students to monitor, analyze and repair an automation-driven process. The automation-driven process includes at least one scaled model factory station simulator such as: a robot station, a warehouse station, a furnace processing station, and error checking color sorting station. A problem interjecting device to introduce errors to the automation-driven process through discrete I/O interfacing to interrupt process flow by breaking inputs and breaking outputs. Students at the student work stations, independently or concurrently, analyze and repair interruptions in automation-driven process through use of interface software and electrical measurement instruments. Students learn theoretical and practical hands on technical knowledge for debugging and troubleshooting programmable logic control systems and automation-driven mechanical systems.

20 Claims, 10 Drawing Sheets

400

| Location | 1 | Weighted Value 1 | Location | 4 | Weighted Value 8 | Location | 7 | Weighted Value 64 |
|---|---|---|---|---|---|---|---|---|
| | 2 | 2 | | 5 | 16 | | 8 | 128 |
| | 3 | 4 | | 6 | 32 | | 9 | 256 |
| | | | | Active Location - Position #1 | | | Summed Value 511 | |

| Location | 1 | Weighted Value 0 | Location | 4 | Weighted Value 8 | Location | 7 | Weighted Value 64 |
|---|---|---|---|---|---|---|---|---|
| | 2 | 2 | | 5 | 16 | | 8 | 128 |
| | 3 | 4 | | 6 | 32 | | 9 | 256 |
| | | | | Active Location - Position #2 | | | Summed Value 510 | |

FIG. 5

MECHATRONIC FACTORY SIMULATION SYSTEM AND METHOD OF TEACHING HOW TO RESOLVE ERRORS IN AN AUTOMATION-DRIVEN PROCESS

FIELD OF THE DISCLOSURE

The present disclosure relates generally to a mechatronic factory simulation system and method of teaching how to resolve complex control system errors in an automation-driven process. More so, the present disclosure relates to a system and method that serves as a simulator that replicates a real "brick and mortar" factory using scaled model factory station simulators. The mechatronic factory simulation system has been configured to include multiple Programmable Logic Controller (PLC) control systems which are autonomous in nature but are designed in such a way that they work together as sub-systems to detect and resolve errors in an automation-driven process to be used to train a student technicians to diagnose and correct problems in a real factory.

BACKGROUND OF THE DISCLOSURE

The following background information may present examples of specific aspects of the prior art (e.g., without limitation, approaches, facts, or common wisdom) that, while expected to be helpful to further educate the reader as to additional aspects of the prior art, is not to be construed as limiting the present disclosure, or any embodiments thereof, to anything stated or implied therein or inferred thereupon.

In any manufacturing business staying profitable and successful depends on production. In large factories employees such as technicians and engineers must be able to debug and troubleshoot sophisticated machinery that is part of a large production system that can breakdown due to problematic hardware and software. Any one problem in any machine can stop production for the entire system. Thus it is vital that technicians are able to efficiently diagnose and correct problems as a team. Teaching student technicians on the factory floor how to efficiently diagnose and correct problems as a team in an actual factory environment can be extremely dangerous and inefficient while production is in process. Environmental factory conditions like working in tight space around large machinery which normally operates at high voltages (480 volts is typical) with dangerous moving parts, fork truck traffic, dangerous floor conditions (i.e. floors littered with oil spills, parts, and other debris created by the production process), lack of environmental control for noise, exhaust fumes, humidity and hot or cold temperatures.

Risk of downtime and other potential loss of income is also a big problem with training at the factory. Machinery can cost millions of dollars and in the training process machines can be damaged resulting in down time, costly repairs and lost production, thus training on production machinery is a worrisome problem in industry that needs a solution.

Often, problems can interrupt the process in a factory. The errors typically occur in the loading, unloading, processing, and error checking or sorting of the system. These interruptions in an automation-driven process require debugging and troubleshooting of programmable logic control systems.

Others have attempted the training of student technicians using some mechatronics to solve the onsite training problem. Originally, mechatronics just included the combination of mechanics and electronics, therefore the word is a combination of mechanics and electronics. Now, mechatronics is a multidisciplinary field of science that includes a combination of mechanical engineering, electronics, computer engineering, telecommunications engineering, systems engineering, and control engineering. The problem with these mechatronics systems is that they do not provide a scalable factory environment that teaches students both theoretical and practical hands on technical knowledge in the practical use and methods of debug and troubleshooting of programmable logic control systems as they apply to the automation-driven mechanical systems they control.

Generally speaking plants rely on the Original Equipment Manufacturers (OEM) of the machinery that they purchase and controls manufacturers to provide both technical support and technical training. Generally this is done offsite at the OEMs or the Controls manufacture facility. This means plant personnel have to drive or in some cases fly to where the training is held. Beyond the hourly cost of the employee and the fact that the employee is no longer performing his or her duties the plants have to face travel cost including hotel, car rental and meal cost, which can be prohibitively expensive.

In regards to the Original Equipment Manufacturers and their primary role, is to simply build machinery. Even though they know the machinery that they build very well they generally do a poor job at imparting technical information because of the lack of proper simulations systems. In most cases service technicians or field service engineers act as technical instructors that provide a general review of the machinery. Without structured course work or focused simulation systems the training is poor and the OEM generally does not teach the control instead they focus mainly on how the machines functions.

Because the OEMs do not teach the control, the plants must once again send their personnel out to the controls manufacture facility where training is a secondary function done by field service engineers. Controls manufactures tend to use the training time as a sales presentation and the students get very little benefit from this unstructured training session.

In either case the student is being poorly trained and at no time is the OEM teaching the interplay between the machine and its control and the same can be said about the controls manufacturer teaching the machine side of the mix. This creates a situation where plants make significant investments to train their personal only to find them lacking and poorly prepared to overcome the challenges presented when this type of complex machinery breaks down. As a result the plant having invested in multiple training programs still suffers the enormous cost of down time for these multi-million dollar machines, in addition to having to pay for and wait for either the OEM or Control manufacturer service representative to arrive to resolve the issue.

Clearly there remains a long felt need for a mechatronic factory training and simulation system and method of teaching how to detect and resolve complex control system errors in an automation-driven process by replicating and scaling a "brick and mortar" factory system having the same level of technology that a factory operates on.

SUMMARY

Illustrative embodiments of this disclosure are generally directed to a mechatronic factory training and simulation system and method of teaching how to resolve complex control system errors in an automation-driven process. The system and method serves as a simulator that replicates a real "brick and mortar" factory using scaled model factory station simulators. The mechatronic factory simulation system includes independent control sub-systems that work together to control, operate and monitor an automation-driven process to be used to train a technician to diagnose and correct problems in a real factory. The independent control sub-systems and the student work stations allow students to simultaneously monitor and diagnose problems in an automation-driven process in the same way a technician in a real factory would diagnose and correct problems.

The student work stations also allow student technicians to load software and flash firmware to a Programmable Logic Controller (PLC) and a Human Machine Interface (HMI) to initiate the automation-driven process. The student technician through software directs an Ethernet Message Common Internet Protocol (MSGCIP) command to and from a programmable logic control to operate the automation-driven process. The automation-driven process may include, without limitation, at least one scaled model factory station simulator such as a robot station, a warehouse station, a furnace processing station, and error checking color sorting station. At least one autonomous control can control these functions.

At least one remote control problem interjecting device introduces at least one artificially manufactured error to the automation-driven process through discrete I/O interfacing to interrupt the process breaking inputs and breaking outputs. As a result of the interruption, the students at the student work stations, independently or concurrently, work to identify and resolve the interruption in the automation-driven process with electrical measurement instruments and other mechatronic analysis and resolve means known in the art. In this manner, the system and method teaches students both theoretical and practical hands on technical knowledge in the practical use and methods of debugging and troubleshooting of PLC systems and the automation-driven mechanical systems they control.

In one aspect, a method of teaching and instructing how to resolve errors in a mechatronic factory simulation system, the system comprising:
connecting at least two independent control sub-systems that work together to detect and resolve errors in an automation driven process, whereby the independent control sub-systems include at least one student work station and at least one scaled model factory station simulators such as: a robot station, a warehouse station, a furnace processing station, and error checking color sorting station;
preparing software and firmware to provide instructions to the automation-driven process from the multiple student work stations;
sending an Ethernet MSGCIP command to and from a programmable logic control to operate the automation-driven process;
introducing, from at least one remote control problem interjecting device, at least one artificially manufactured error command to the automation-driven process through discrete I/O interfacing,
whereby at least one artificially manufactured error command interrupts the automation-driven process;
identifying, from the multiple student work stations, the type of interruption in the automation-driven process by the use of interface software and with an electrical measurement instrument; and
resolving, from the multiple student work stations, the automation-driven process with the electrical measurement instrument,
whereby the analysis is determinative of the type of error.

In another aspect, the multiple student work stations are four student work stations.

In another aspect, the step of introducing, from at least one remote control problem interjecting device, at least one artificially manufactured error command to the automation-driven process through discrete I/O, further comprises introducing twelve errors for each student work station.

In another aspect, the step of preparing software and firmware to provide instructions to the PLC automation-driven process from the multiple student work stations, further comprises loading a software, from the multiple student work stations, to at least partially initiate the automation-driven process.

In another aspect, the method further comprises a step of passing commands between the controls using Ethernet MSGCIP instructions to at least one robot.

In another aspect, the multiple student work stations comprise four student work stations sized at four feet length by four feet width, with an attached 18" by 30" of student work space peninsula that is perpendicular to the student workstation and a 12" by 30" PLC control and HMI area that is parallel to the table.

In yet another aspect, the step of analyzing, from the multiple student work stations, the type of interruption in the automation-driven process, further comprises analyzing the type of interruption in the automation-driven process from each student work station.

In still another aspect, at least one robot comprises a part unload robot and a rotary table stacking system.

In another aspect, at least one robot is a three-axis robot.

In another aspect, at least one robot comprises a pneumatic and vacuum end effector.

In another aspect, a scaled model factory station simulator warehouse comprises a nine location raw part warehouse and part retrieval system.

In another aspect, a scaled model factory station simulator furnace processing station comprises a furnace and milling system.

In another aspect, a scaled model factory station simulators error checking color sorting station comprises a color sorting system.

In another aspect, multiple student work stations comprises a human-machine interface and a laptop computer.

In another aspect, at least one remote control problem interjecting device comprises a twelve channel radio frequency controlled relay module.

In another aspect, the step of sending an Ethernet MSGCIP command to and from a programmable logic control to control an automation-driven process, further comprises passing data between controls as in a command response structure or a handshake.

In another aspect, at least one artificially manufactured error command interrupts signals from field devices to the programmable logic control.

One objective of the present disclosure is to teach students both theoretical and hands on technical knowledge in the practical use and debug of programmable logic control systems and the automation-driven mechanical systems they control in a structured clean and quiet class room learning environment that greatly increases a student's learning opportunity and at the same time totally eliminates the risk of machine down time, student injury, and without damaging expensive machinery and many of other factory related issues.

Another objective is to provide multiple student work stations that the students can switch between to practice new analysis and resolution techniques.

Yet another objective is to create a series of command response handshakes between the control sub-systems and at least one robot.

Yet another objective is to challenge the students to resolve the reason for the interruption in the automation-driven process.

Yet another objective is to teach the student technician to perform orderly, remedial analysis of the PLC control systems for the automation-driven process and to resolve the interruptions inserted into the system by the problem interjecting devices.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The disclosure will now be described, by way of example, with reference to the accompanying drawings, in which:

FIG. 4 illustrates a Table of an exemplary Binary weighted value for the warehouse before loading on the automation-driven process, in accordance with an embodiment of the present disclosure;

FIG. 5 illustrates a Table of an exemplary weighted value for the warehouse after loading on the automation-driven process, in accordance with an embodiment of the present disclosure;

Like reference numerals refer to like parts throughout the various views of the drawings.

DETAILED DESCRIPTION OF THE DISCLOSURE

Figure 1:
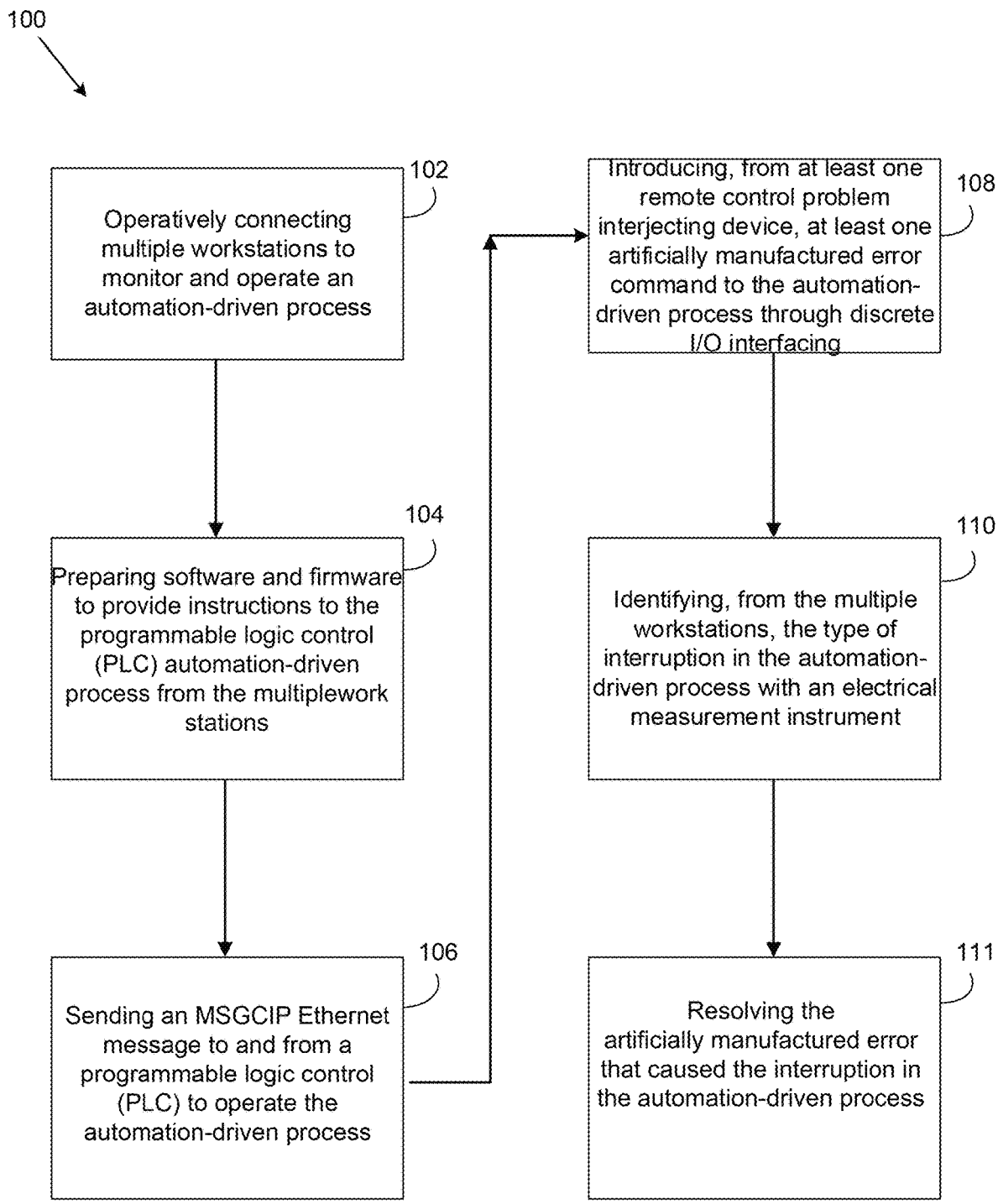
FIG. 1 illustrates a flowchart of an exemplary method of teaching and instructing how to resolve errors in an automation-driven process, in accordance with an embodiment of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the disclosure as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

The present disclosure relates to a mechatronic factory simulation system and method of teaching how to resolve complex control system errors in an automation-driven process. The method serves as a simulator that replicates a real "brick and mortar" factory using scaled model factory station simulators. The mechatronic factory simulation system includes independent control sub-systems that work together to control, operate and monitor an automation-driven process to be used to train student technicians to diagnose and correct problems in a real factory. The independent control sub-systems include student work stations which allow students to simultaneously monitor and debug an automation-driven process in the same way a technician in a real factory would diagnose and correct problems. The student work stations also allow the students to load software and flash firmware to initiate the automation-driven process. An Ethernet MSGCIP message directs commands to and from a programmable logic control and the automation-driven process they control and at least one artificially manufactured error is introduced into the process with discrete I/O interfacing from at least one remote control problem interjecting device, so as to interrupt the automation-driven process so that the student technician, independently or concurrently works to identify and resolve the interruption in the automation-driven process with electrical measurement instruments.

The mechatronic factory training and simulation system is comprised of a suit case prequel learning system and a two student work station and four student work station each using a scaled factory station simulation system. This system has been designed with a method of injecting teachable problems through the interruption of discrete I/O signal with the intent to interrupt the machines process by the breaking of inputs and output signals as to teach methods of detecting and resolving errors in a PLC controlled automation-driven process. Students at the student work stations independently or concurrently analyze and resolve interruptions in the automation-driven process through use of interface software and electrical measurement instruments. Students learn theoretical and practical hands on technical knowledge for debugging and troubleshooting PLC control systems and there mechanical systems that comprise the automation-driven process.

FIG. 1 references a method 100 of teaching and instructing how to resolve errors in a mechatronic factory training and simulation system. The method comprises an initial Step 102 of operatively connecting multiple student work stations to monitor, analyze and resolve an automation-driven process of controlling scaled model factory station simulators.

A Step 104 includes preparing software and firmware to provide instructions to the automation-driven process PLC from the multiple student work stations. Prior to operating the method, a learning step includes loading and preparing software and firmware to the logic control system. This is performed from the individual student work stations and for teaching purposes.

For example, in one embodiment, the method includes loading software, from the multiple student work stations, to at least partially initiate the automation-driven process. And further, the method includes flashing firmware, from the multiple student work stations, to at least partially initiate the automation-driven process. The firmware is defined as an operating system. In essence, firmware is the executive software, behind and not seen.

Figure 3A:
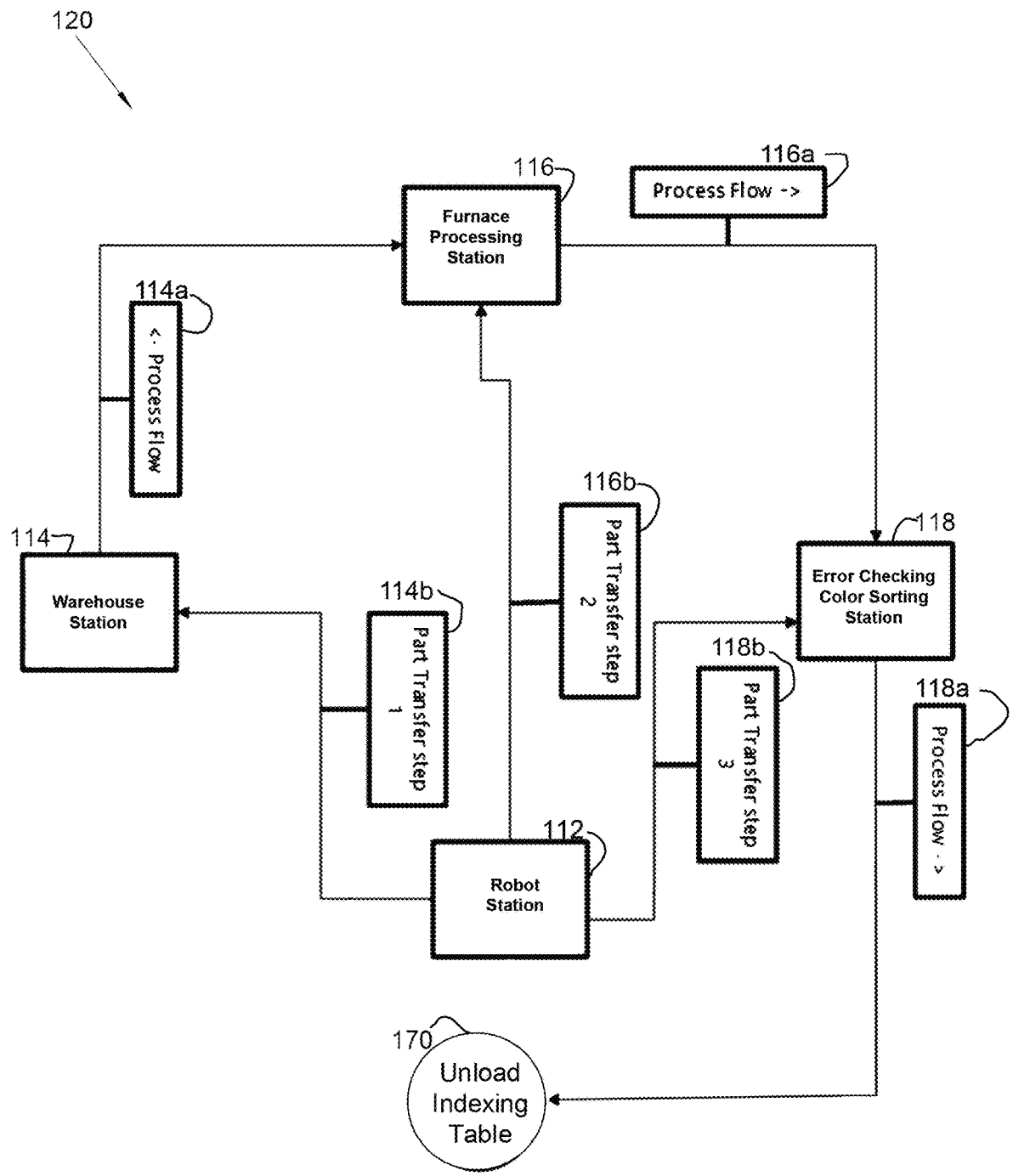
FIG. 3A is a block diagram illustrating a part process flow of an exemplary automation-driven process, in accordance with an embodiment of the present disclosure.

A Step 106 comprises sending an Ethernet MSGCIP message command to and from a programmable logic control to control the automation-driven process controlling scaled model factory station simulators. This transfer of data for operation of the automation-driven process can be defined by a command response handshake, where commands are passed between scaled model factory station simulators 112, 114, 116, 118 of the process 120, as shown in FIG. 3A.

Step 108 introduces from at least one remote control problem interjecting device 208a, 208b, 208c, 208d (See FIG. 2), at least one artificially manufactured error command to the automation-driven process 120 through discrete I/O. The artificially manufactured error command interrupts the automation-driven process 120. Introducing errors in this manner allows an instructor to inject a structured and teachable problem with defined learning objectives. In one embodiment, the instructor can freely move around with a mobile radio frequency transmitter that is a remote control problem interjecting device which introduces various combinations of errors at the instructor's discretion.

A Step 110 further includes analyzing, from the multiple student work stations from laptops 202a-d (See FIG. 2), the type of interruption in the automation-driven process with an electrical measurement instrument. The aforementioned interruptions at each scaled model factory station simulators of the process 120 are analyzed with electrical instrumentation known in the art. A Step 111 comprises resolving errors, from the multiple student work stations through laptops 202a-d, the automation-driven process 120 with the electrical measurement instrument. The analysis is determinative of the type of artificially manufactured error that caused the interruption.

Four Student Work Station Mechatronic Factory Simulation System

A preferred embodiment of this disclosed Mechatronic Factory Simulation System is a four student work station mechatronic factory simulation system that utilizes four independent control sub-systems that work together to control, operate and monitor an automation-driven process to be used to train a student technician to diagnose and correct problems encountered in a factory setting without having to physically be in a factory. The four work station system builds on the two work station training systems control philosophy and allows for an orderly learning progression into the use of Ethernet for data communications between Micro 850 Ethernet based controls, this as opposed to the discrete I/O communication that was used on the two station system.

In addition, each independent control sub-system utilizes four separate micro logics 850 PLC controls which are connected to each other via Ethernet through an unmanaged Ethernet switch. Each of the micro 850 PLC's are responsible to control one of the scaled model factory station simulators, such as a warehouse station, a robot station, a furnace processing station, an error checking color sorting station and a sorting index table.

The four student work station mechatronic factory simulation system used in conjunction with the two student work station mechatronic factory simulation system and the suitcase system advances a student's understanding and ability to debug complex control systems without having to train at an actual factory. It also introduces the students to the next level of PLC based Ethernet communications and into the methods and techniques used in debugging in an advance multi-control plc system.

In summary the four student work station mechatronic factory simulation system design allows for and promotes advanced technical reasoning and structured problem solving and troubleshooting, and is intended to be the capstone piece of the training methods disclosed herein.

Figure 2:
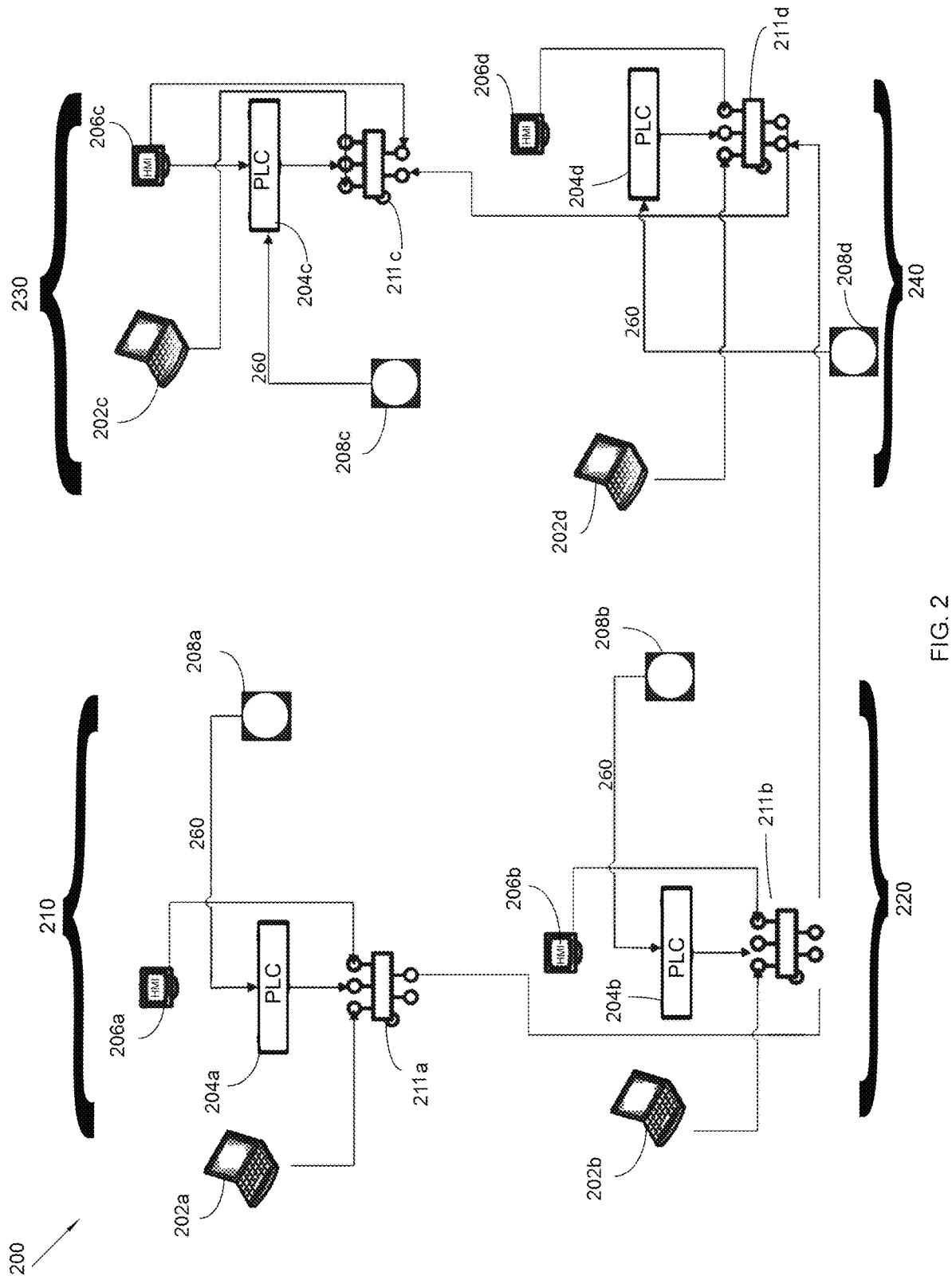
FIG. 2 illustrates diagram view of the controls architecture for an exemplary mechatronic training and simulation system, in accordance with an embodiment of the present disclosure.

FIG. 2 illustrates a diagram view of the controls architecture 200 for an exemplary mechatronic factory simulation system, in accordance with an embodiment of the present disclosure. FIG. 3A illustrates a block diagram of an exemplary part process flow automation-driven process 120. The system and method serve as a simulator that replicates a scaled factory having scaled model factory station simulators that allow students to simulate operations and problem resolutions of an automation-driven process 120 from multiple student work stations. Errors are artificially introduced into different stations of the automation-driven process 120, and the student at each student work station attempts to analyze and resolve the pertinent error. The students may then switch student work stations to analyze and resolve the different types of problems commonly occurring in an automation-driven process 120.

As FIG. 2 illustrates, controls architecture 200 provides independent control sub-systems that work together to control, operate and monitor an automation-driven process. Each independent control sub-system has a student work station that allows students to simultaneously monitor, analyze and resolve the error in the automation-driven process. The automation-driven process 120 loads, processes, error checks and sorts parts (see FIG. 3A).

Automation-driven process 120 is controlled by autonomous control through a Message Instruction Map and Ethernet IP Address Map 600 (see FIG. 6) that are transmitted to and from a programmable logic control (PLC) 204a-d. Student work stations include laptops 202a-d and multiple human machine interfaces (HMI) 206a-d that allows student technicians an effective way to monitor, analyze and resolve the error in the automation-driven process 120, whilst the machine simultaneously feeds back information that aids the student's decision-making process. Each independent control sub-system has a problem interjecting device (problem interjecting devices 208a-d) which introduces at least one artificially manufactured error 260 to the automation-driven process through discrete I/O interfacing. As seen in FIG. 2 errors 260 work to interrupt the process breaking inputs and breaking outputs. As a result of the interruption caused by the errors 260, the students at the student work stations, independently or concurrently, attempt to analyze and resolve the interruption in the automation-driven process 120 with electrical measurement instruments.

In one exemplary embodiment, there are twelve problems per independent control sub-system and there are four independent control sub-systems which allows for a total of forty eight controllable learning objectives. The sequence of learning is as follows: once the students master an independent control sub-system from a student work station, the student will then index to the next work station and take on a new set of learning objectives. The students switch student work stations four times until the students have collectively learned how to monitor, analyze and resolve errors in mechatronic factory simulation system. The four students work together as a team to demonstrate their abilities to resolve predefined interruptions, so as to maintain operation of the automation-driven process 120. This learning method is designed to create students that can problem solve and debug at very high levels and allow for future learning that is autodidact in nature.

In addition to analyzing and resolving introduced errors, the student work stations also allow the students to load software and flash firmware to the PLC 204a-d and the HMI 206a-d to initiate the automation-driven process 120. In this manner, the system and method teaches students both theoretical and practical hands on technical knowledge in the practical use and methods of debugging and troubleshooting of PLC systems and the automation-driven mechanical systems they control.

In a preferred embodiment of the present disclosure the various hardware for scaled model factory station simulators and independent control sub-systems described herein are manufactured by Fischertechnik®, it should be appreciated that other suitable hardware for scaled model factory station simulators, other than the suggested models can be used in the teaching system of this disclosure such as but not limited to, Lego/Lego Mindstorms®, VEX® (aka Innovation First Labs®), Makeblock®, Engino®, Sensoric®, Kryton 3®, Owi®, Robotis®, Bioloid®, Thames & Kosmos®, Modular Robotics®, Tetrix®, Elenco®, Meccano®, Tinkerbots®, Rockenbok® and the like.

It is also significant to note that a few companies offer some packages with different names, but which actually include either Fischertechnik® sets repackaged, or modified in some way. They include: PCS Robotics® (incorporate FT parts in their own lab sets with curriculum, which comes packed in storage rack systems) Learnscapes/Creative Learning Systems® (same—also include FT parts in custom lab packages for schools) IKH Didactic® (has in the past offered modified versions of some Fischertechnik® industrial models). The present disclosure is scalable, and therefore adapted to operate with other mechatronic components and producers thereof that are presently known and that are developed in the future.

In a preferred embodiment of the present disclosure the various controls for system are described herein are manufactured by Allen Bradly®, it should be appreciated that other suitable control mechanisms, other than the suggested models can be used in the teaching system of this disclosure such as but not limited to, Siemens®, Honeywell®, Modicon®, Fanuc®, General Electric®, PLC Direct® and the like.

In one embodiment, the four student work station mechatronic factory simulation system comprises a Programmable Logic Control, a Human Machine Interface, and an Ethernet Switch.

Figure 6:
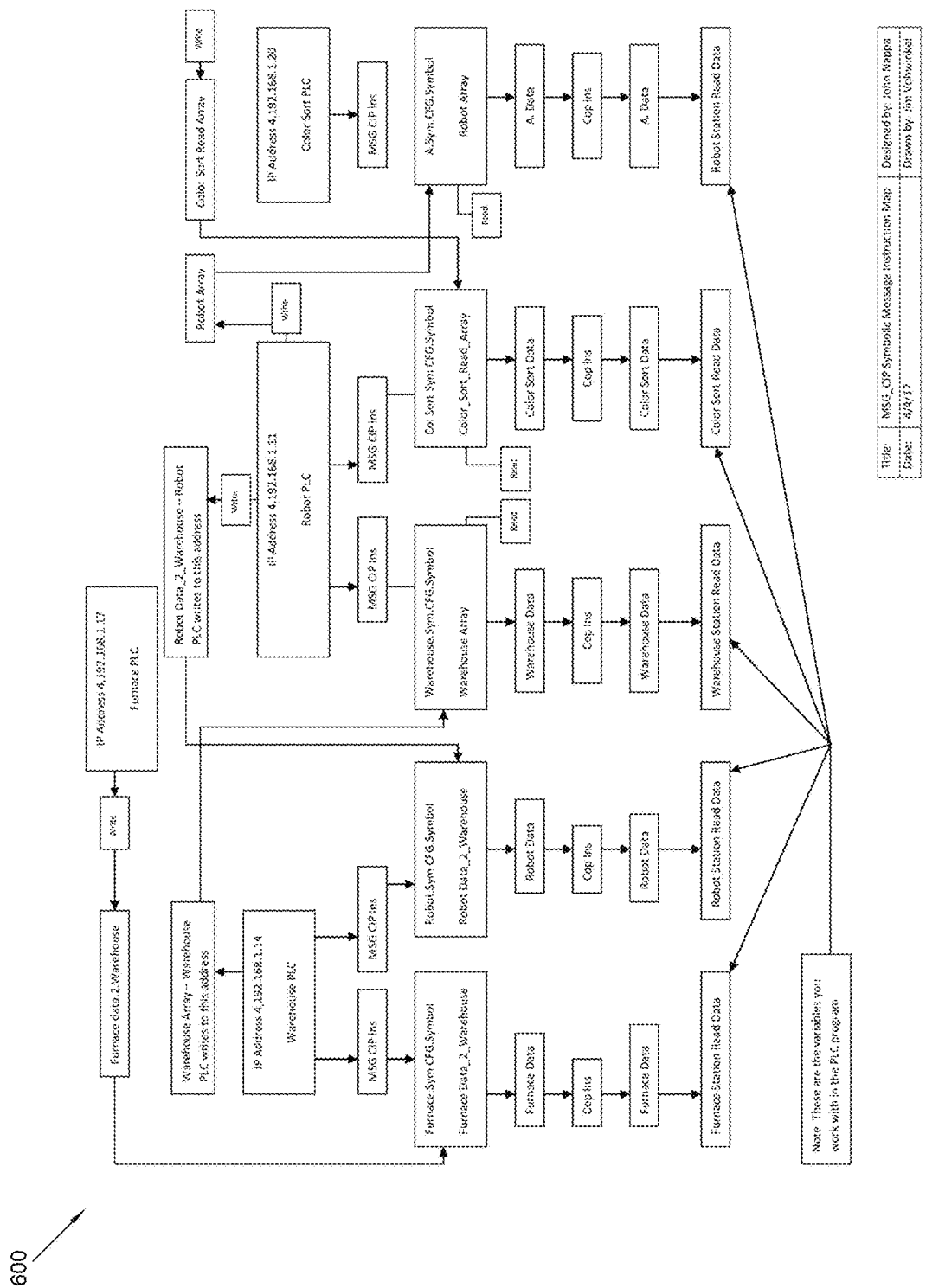
FIG. 6 illustrates a block diagram of an exemplary Ethernet message instruction map, in accordance with an embodiment of the present disclosure.

A Message Instruction Map and Ethernet IP Address Map 600 as illustrated in FIG. 6. Message Instruction Map and Ethernet IP Address Map 600 shows how data is transferred between the control systems via MSGCIP commands. Errors are introduced for student technicians to resolve errors from the student work stations. The remote control problem interjecting device 208a-d comprises a twelve channel radio frequency controlled relay module. Each student work station includes a radio frequency controlled relay control board with twelve individual relays that have been configured in such a way to allow an instructor to inject a structured and teachable problem with defined learning objectives. Forty-eight total error signals are introduced between each independent control sub-system 1-4. The error signals may include at least one of the following:

Problem interjector device 208a located in independent control sub-system 210 sends error interrupt signals to a Robot Station. The following are examples of interruption signals that may be used: Interrupt Vertical Axis Reference Switch Signal. Interrupt Horizontal Axis Reference Switch Signal. Interrupt Rotary Axis Reference Switch Signal. Interrupt Vertical Axis Encoder—A Signal. Interrupt Horizontal Axis Encoder—A Signal. Interrupt Rotary Axis Encoder—A Signal. Interrupt motor vertical axis up. Interrupt Horizontal Axis backwards. Interrupt Rotary Axis CCW. Interrupt Rotary Axis CW. Interrupt Air Compressor and Vacuum system. Interrupt Vacuum control valve.

Problem interjector device 208b located in independent control sub-system 220 sends error interrupt signals to a system using a Warehouse Station. The following are examples of interruption signals that may be used: Interrupt Horizontal Axis Reference Switch Signal. Interrupt Conveyor Photo eye Signal. Interrupt Vertical Axis Reference Switch Signal. Interrupt Conveyor Pickup Position Photo Eye Signal. Interrupt Horizontal Axis Encoder. A Signal Interrupt Vertical Axis Encoder. Interrupt cantilever Reference Switch Signal. Interrupt cantilever extended Switch Signal. Interrupt conveyor motor forward. Interrupt horizontal axis forward "Towards Rack". Interrupt vertical axis down. Interrupt cantilever axis backwards.

Problem interjector device 208c located in independent control sub-system 230 sends error interrupt signals to a system using a furnace processing station. The following are examples of interruption signals that may be used: Interrupt reference switch for turn table vacuum position. Interrupt reference switch for turn table conveyor position. Interrupt reference switch for turn table milling position. Interrupt reference switch for gantry at turn table position. Interrupt reference switch for oven feeder inside position. Interrupt reference switch for oven feeder outside position. Interrupt reference switch for gantry at oven position. Interrupt turn-table motor CW. Interrupt turn-table motor CCW. Interrupt conveyor belt forward motor. Interrupt milling station motor. Interrupt motor for oven feeder retract. Interrupt motor for oven feeder extend. Interrupt motor for gantry towards oven. Interrupt motor for gantry towards turn-table.

Problem interjector device 208*d* located in independent control sub-system 240 sends error interrupt signals to a system using a checking color sorting station. The following are examples of interruption signals that may be used: The error signals introduced in the process 120 for this configuration include: Interrupt Conveyor limit switch pulse counter for conveyor positioning. Interrupt conveyor Photo Eye on input side of color sorter. Interrupt conveyor Photo Eye on output side of color sorter. Interrupt analog value of color sorter to control analog card. Interrupt red parts spur part detected photo eye signal. Interrupt white parts spur part detected photo eye signal. Interrupt blue parts spur part detected photo eye signal. Interrupt conveyor forward signal. Interrupt compressor on signal. Interrupt red pneumatic cylinder on signal. Interrupt white pneumatic cylinder on signal. Interrupt blue pneumatic cylinder on signal.

Independent control sub-system may include four student work stations equipped with laptops 202*a*, 202*b*, 202*c*, 202*d* located in an area sized at about 4' length by 4' width. In a preferred embodiment of the present disclosure the laptops described herein are manufactured by Dell®, specifically the Dell® D620 laptop, it should be appreciated that other suitable devices, other than the suggested model and type can be used in the teaching system of this disclosure such as but not limited to: tablets, smartphones, PC computers, and the like. In another embodiment, student work stations include an attached 18" by 30" of student work space in a peninsula that is perpendicular to the student work station and a 12" by 30" PLC control and HMI area that is parallel to the table. In this embodiment, it is preferred to use an Allen Bradley® 4.3" human machine interface (HMI), it should be appreciated that other suitable hardware for an HMI, other than the suggested model can be used in the teaching system of this disclosure. This student work station design configuration allows ease of view and access of both the process and the control system. Though in other embodiments, other dimensions for the student work station are possible.

In one embodiment, each independent control sub-system can have its own PLC 204*a*, 204*b*, 204*c*, 204*d* that requires analysis and resolving errors in response to introduced error that causes interruption in the automation-driven process 120. The PLC can be thought of as an industrial digital computer which has adapted for the control of manufacturing processes, such as assembly lines, or robotic devices, or any activity that requires high reliability control and ease of programming and process fault diagnosis.

In one embodiment, student technicians can alternate through all or some of the student work stations to learn new problems and apply new resolutions, dependent on the type of error introduced into the automation-driven process 120. To optimize interactive efficiency for the student at the student work stations, an HMI touchscreen can be integrated into each student work station. Each student workstation can have its own HMI 206*a*, 206*b*, 206*c*, 206*d*. HMI 206*a-d* allows for effective operation and control of the machine from the human end, as the HMI simultaneously feeds back information that aids the student's decision-making process. Each independent remote control problem interjecting device control sub-system has an unmanaged Ethernet switches 211*a-d* which are PLC controls that allow Ethernet devices to communicate with each other.

FIG. 3A is a block diagram illustrating a part process flow of an exemplary automation-driven process 120 which is segregated into different scaled model factory station simulators that are monitored, analyzed, and resolved errors from corresponding student work stations.

As illustrated in FIG. 3A, the automation-driven process 120 includes the following scaled model factory station simulators: a robot station 112, a warehouse station 114, a furnace processing station 116, and an error checking color sorting station 118. Robot station 112 is called to move parts it loads, unloads, and carries parts from and to each scaled model factory station simulator. In one embodiment, robot station 112 is a three-axis robot. In yet other embodiments, robot station 112 comprises a pneumatic and vacuum end effector. Though other types of robots may be used, including a four or a multi-axis robot. The robot is centrally located and positioned to move parts from the warehouse station to the furnace processing station and from the error checking color sorting station to an index table 170.

In addition, autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted in the art.

FIG. 3A illustrates a block diagram of an exemplary part process flow automation-driven process. Robot station 112 is programmed to follow a sequence of operations to perform the function of moving parts from station to station. In a first step robot station 112 carries the part along process flow 114*a* from the warehouse station 114 in part transfer step 114*b* to the furnace processing station 116. The warehouse station 114 may include a nine location raw part warehouse and part retrieval system. The nine location raw part warehouse and part retrieval system is a storage site where the parts are picked up by the robot station 112 to await processing in the furnace processing station 116. The furnace processing station 116 may include a furnace and milling system. In this simulation parts may be processed in various ways, including milling, cooking, painting, molding, and reshaping.

The warehouse station 114 is systematic, using logic to count the parts passing through each scaled model factory station simulators 112, 114, 116, 118 of the automation-driven process 120. Warehouse station 114 is defined in a first table 400 showing the weighted values of the parts in a first active position (FIG. 4); and a second table 500 that shows the second weighted values of the parts in a second active position (FIG. 5) after parts have been loaded for processing. The summed value of parts decreases from the first table to the second table as parts are picked up by the robot station 112.

Warehouse station 114 is operable through a specific Sequence of Operation (SOP). SOP utilizes a Manual Mode Selection and Axis Referencing. The manual mode includes the following steps: Select "Reset" on the "main operation page on the HMI" and then select "Manual Mode". The Machine indicates that the manual mode is active and manual functions are enabled.

The Axis referencing mode includes at least one of the following steps: 1) Select the "vertical axis" on the main operations page. 2) Select "vertical axis down", this jogs the axis. Jog until the axis is no longer actuating the Reference return limit switch, and then stop. Press "main page" return. 3) Select the "Horizontal axis" on the main operations page.

4) Select "Horizontal axis to rack", this jogs the axis. Jog until the axis is no longer actuating the Reference return limit switch, and then stop. Press main page return. 5) Select the "cantilever axis" on the main operations page. 6) Select "cantilever forward", this jogs the axis. Jog until the axis is no longer actuating the Reference return limit switch, and then stop. Press "main page return".

Furthermore, on the main operations page select "reference mode". A reference is required and displays and flashes on the HMI. Select start reference cycle on the HMI. At this point the Automatic referencing sequence will be activated and all three axes will simultaneously move to their respective reference switches and then stop. At this point the machine is considered to be referenced. It should be noted that we are using DC motors with Encoder Feedback, the encoders are A and B square wave pulses operating at TTL Level with a sine and cosine relationship between them. This is done for both the horizontal and vertical axis. The cantilever is simply counting once per rev Limit switch pulses from a cam actuator located on its motor.

It should also be noted that the axis position is tracked with software by synchronizing the encoders pulse train to a High Speed Counter module located in the AB Micro 850 control. When we reference the axis and stop on the reference limit switch we are synchronizing the mechanical position to the internal mathematical position, thereby allowing us to determine the axis physical position in terms of a numeric value.

The SOP for the warehouse station 114 further comprises a function review. The function review includes mode selection, referencing, and SOP. This includes the following steps: 1) Colored parts are manually placed into the pallets and then the robot loads the pallets on the warehouse rack. 2) On main operator page select "manual mode" then "part location page". 3) Select "instructor only" and note that the PV graphical Part present locations will now have a "1" displayed in each of the nine locations.

Continuing, with the steps for function review, another step 4) Select "strobe values" and note that the part tracking data table will be loaded. The value 511 displays on the HMI screen directly below the strobe value. This indicates that the machine has a full rack and nine parts are present. It should also be noted that the value of 511 is derived from the binary value weighted sums of the nine rack positions. This will be explained in more detail under the warehouse Sequencer steps section.

The Objectives include an Automatic Mode and Cycle start. Select "Reset" on the main operator page and then select "Auto-Mode". If successful the Auto-mode indicator will be active, if not a fault will be displayed on the HMI indicating what the fault is. Cycle Start. Before placing the parts in the warehouse station into cycle the robot station, furnace processing station, and the error checking color sorting station must be referenced, not faulted and placed in automatic mode. Once the factory system is ready, "cycle start" is selected on a main operator's page.

Once a part is selected and moved out into the process by the robot, the sum of the binary weighted value is decreased by the weighted position of the location the part was taken from. (see FIG. 5 showing the absence of a part). Note that the second active location is 2. For example, the first table 148 shows the summed values of the parts at 512 (FIG. 4), and second table shows the summed values decreasing to 511 as a part is removed by the robot (FIG. 5).

Objectives of the warehouse Sequence of operations for the robot station 112 to move parts. It is significant to note that once cycle start has been requested the following sequence will occur: Both the Vertical and Cantilever axis on the pick and place are commanded "CMD" in the direction of the storage rack. The destination is determined by the weighted values of the parts in the rack. Where each part has a binary value that is weighted based on its location in the rack.

One possible Sequence of Operations is as follows: Cantilever is CMD forward or 'FWD' to its pickup position or depth in the rack. Note that this is determined by software "SW" range or SW stop limit that is established in the control. Vertical axis is CMD "up" to its SW stop limit. Cantilever axis is CMD is commanded backward or 'BKWD' to its reference or returned position limit switch. Horizontal axis is CMD in the return direction away from the rack & towards the conveyer to its SW stop limit.

Cantilever axis is CMD FWD to its SW stop limit, which is in position to deposit the part onto the outfeed conveyor. Vertical axis CMD down to the SW stop limit which places the part on the outfeed conveyor. Outfeed conveyor is CMD FWD until the part pallet actuates the conveyor FWD pickup position photo eye, at that point the conveyor stops.

At this point the warehouse Micro 850 sends a value of '10' to the Robot Micro 850 via an Ethernet MSG CIP Instruction. The robot in turn is CMD to pick up the part from the pallet and transfer it to the furnace. Once the robot transfers the part to the furnace it sends the value 4 to the warehouse micro 850 indicating that the robot is clear and the ware house can continue operations. This is referenced in FIG. 6 as the 10-4 command response handshake. The 10-4 command response handshake includes the following Commands. If no response, the next command cannot continue. Once the value '4' has been received at the warehouse micro 850 control the 10/4 handshake is complete.

Vertical axis is CMD up until the Reference/returned Limit Switch is actuated. Cantilever CMD backwards until the Reference/Returned Limit switch is actuated. Horizontal axis is CMD towards the rack and its destination is to return the empty part pallet to its original location. Cantilever CMD forward to SW stop limit which is inside the rack for final drop off position. Vertical axis CMD down to its SW stop limit. Cantilever axis CMD backward to its Reference/Returned limit switch position. Vertical axis CMD "UP" to its reference/return limit switch position. Horizontal axis CMD towards conveyor position away from rack until it stops at the reference/Return position limit switch.

Once the first cycle is completed a timer in the Micro 850 PLC waits for three seconds and starts the sequence again. At that instant the location value is decremented by the weight of the value of the rack location that was emptied. Once the value of the rack is calculated the software determines a new location and the pick and place is CMD to that new location and the sequence continues until the "rack has been emptied". At that point a message stating the rack is empty displays.

A Standard Operating Procedure for the Robot to Load Warehouse includes the following: Once the warehouse station has a part ready for pickup its AB Micro 850 sends the value '10' VIA Ethernet MSG CIP message instruction to the robot Micro 850 commanding pickup and transport to the furnace processing Station. Once the Robot Sequence begins and it is clear of the warehouse conveyor belt it sends a '4' back to the warehouse micro 850 and it resumes its operation.

Rotary Axis is CMD Counter Clock Wise or 'CCW' to its furnace pickup position which is determined by software "SW" range or SW stop limit, and then stop. Horizontal axis CMD FWD until its SW stop limit. Vertical axis CMD down to its SW stop limit. CMD the air compressor on, this step creates a vacuum through the use of a double cylinder configuration, one cylinder is pressurized and the other creates a vacuum based on the first cylinders motion, the cylinders are mechanically coupled together. This will be used by the robot vacuum end effector to pick up the part which is described in the next step. Vacuum valve on, part is secured to Robots end effector.

At this point, the Vertical axis CMD remains up until it actuates its Reference/Returned limit switch position. Horizontal axis BKW until it actuates its Reference/Returned limit switch position. Rotary Axis is CMD Clock Wise or 'CW' until its SW stop limit is reached, which places the Robot in front of the furnace processing stations loading in feed shuttle. Vertical axis CMD down until its SW stop limit, which place the part on the feed shuttle. Vertical axis CMD up until it actuates its Reference/Returned limit switch position. Horizontal axis CMD backward until it actuates its Reference/Returned limit switch position. Rotary Axis is CMD Clock Wise or 'CW' until it actuates its Reference/Returned limit switch position. The robot is now returned to its Reference position and awaits its next CMD.

At robot station 112, the following commands occur: Function review to include mode selection, referencing and Sequence of Operations.

In a Manual Mode, the sequence includes: Select "Reset" on the "main operation page on the HMI" and then select Manual Mode. The Machine will then indicate manual is active and manual functions are now enabled.

For Axis Referencing: Select the "vertical axis" on the main operations page. Select "vertical axis down", this will jog the axis. Jog until the axis is no longer actuating the Reference return limit switch, and then stop. Press main page return. Select the "Horizontal axis" on the main operations page. Select "Horizontal axis forward", this will jog the axis. Jog until the axis until it is no longer actuating the Reference return limit switch, and then stop. Press main page return. Select the "Rotary axis" on the main operations page. Select "Rotary axis CW", this will jog axis. Jog until the axis until it is no longer actuating the Reference return limit switch, and then stop. Press "main page" return. On the main operations page select "reference mode"—Reference required will now display and flash on HMI. Select start reference cycle on the HMI. At this point the Automatic referencing sequence will be activated and all three axes will simultaneously move to their respective reference switches and then stop. At this point the machine is considered to be referenced.

It is significant to note that DC motors are used with Encoder Feedback. The encoder signals are A and B square wave pulses operating at TTL Level with a sine and cosine relationship between them; this is done for the three axes; the horizontal, vertical axis and rotary. It should also be noted that we keep track of the axis position in software by synchronizing the encoders pulse train to a High Speed Counter module located in the AB Micro 850 control. When we reference the axis and stop on the reference limit switch we are synchronizing the mechanical position to the internal mathematical position, thereby allowing us to determine the axis physical position in terms of a numeric value.

In an Automatic Mode, the sequence includes: Select "Reset" on the main operator page and then select "Auto-Mode". If successful the Auto-mode indicator will be active, if not a fault will be displayed on the HMI indicating what the fault is. Cycle Start. Before the robot station cycles the warehouse station, furnace processing station, error checking color sorting station must be referenced, not in a faulted state and placed in automatic mode. Once the factory system is ready you are clear to press the "cycle start" on the main operator's page.

In one possible embodiment, a Standard Operating Procedure (SOP) for processing the part in furnace processing station 116 includes the following steps: Machine Initial conditions are established from the onset of Sequence Position '0'. At sequence step 0 the following conditions occur; The Turn Table is CMD returned to its CCW position, the Oven Feeder is CMD retracted, the part transport Gantry is CMD returned to the turn table position, the compressor is CMD on and the furnace door is CMD opened.

Simultaneously CMD the following; CMD oven Feeder to Extend position and stop motion once the extend limit switch is actuated, CMD Gantry to turn table position and stop motion once the in position limit switch is actuated and then CMD the Turn table CCW until the CCW limit switch is actuated. Once the robot place a part on the oven feeder and part present photo eyes are actuated the following occurs. Simultaneously CMD oven feeder to retract until retract limit switch is actuated and turn on oven light to simulate that processing has been initiated. CMD oven door to close, dwell three seconds.

Simultaneously CMD oven door to open, CMD part transport gantry to oven and stop motion once it actuates the oven position limit switch. CMD gantry part vacuum-pickup to lower into position to pick up the processed part. CMD vacuum valve on, end effector now has part gripped. CMD gantry part vacuum-pickup to rise. Note the pneumatic cylinder is controlled by an electrically controlled valve but is pneumatically lowered and mechanically returned, i.e. the cylinder is spring returned. CMD part transport gantry to turntable position and stop motion once it actuates the turntable position limit switch.

Simultaneously CMD gantry part vacuum to lower, CMD vacuum valve off and then CMD gantry part vacuum to raise or to its returned position. Part is now deposited on the index turn table. CMD turntable CW to milling station and stop at milling station limit switch, start milling station Saw/Mill and run for two seconds simulating the milling process. After the two seconds dwell CMD turntable CW to the conveyor part pusher position and stop at the index turn table conveyor position.

Simultaneously CMD the part ejector cylinder forward and CMD the outfeed conveyor on. The part is now pushed onto the outfeed conveyor and transported to the infeed conveyor of the error checking color sorting station. Once the outfeed conveyor carries the part to a point where it actuates the color sorter infeed photo eye the part pusher cylinder is CMD to return (electrically released, spring return), at this point the infeed conveyor is CMD off and the turn table is CMD to the CCW direction until it actuates the gantry location limit switch.

The process and furnace station is now returned to its initial conditions state and awaits its next command.

As shown in FIG. 3A after a part is processed in the furnace processing station 116, the part goes to error checking color sorting station 118, in part transfer step 116b along process flow 116a. In a part transfer step 116b the furnace process station's integral gantry pick and place transfers the part to its turn table which then indexes 180° to present the part to the integral milling station. Once this process has been completed the turn table indexes to the 270° position and a pneumatic part pusher transfers the part onto the error checking color sorting station 118 in-feed conveyor along process flow 116a. A pneumatic part pusher transfers the part to error checking color sorting station 118.

The error checking color sorting station 118 is where the parts are sorted based on predetermined parameters. In some embodiments, the parts may be sorted by color with a color sorting system. However in other embodiments, other sorting means for the parts may be used, including sorting by shape, size, and functionality.

After the part is processed at error checking color sorting station 118 robot 112 transfers the part along process flow 118a from the color sorting station 118 to unload indexing table 170. The part process flow is at an end when the part is placed on the index table 170.

For Axis Referencing: The station does not require homing and no encoders are deployed therefore no high speed counters are in use. For Automatic Mode: Select "Reset" on the main operator page and then select Auto-Mode. If successful the Auto-mode indicator will be active, if not a fault will be displayed on the HMI indicating what the fault is.

For Cycle Start: Before the error checking color sorting station can be placed in Auto-Mode, it is necessary to ensure that the Robot station is not faulted and Automatic mode is selected. Once the Robot station is ready the cycle starts on the main operator's page.

A Standard Operating Procedure for the error checking color sorting station to sort parts by color (error checking coloring sorting station 118). Once the error checking color sorting station detects that a part is present at its infeed conveyors photo eye it will then shuttle the part via the conveyor to a color sensor. The conveyor belt position or ultimately the part position is determined by counting the conveyor motors once per revolution switch pulses. These pulses can be used and ultimately translated into a method for predictable linear motion through open loop motor control. Using this positioning approach we then index and sample the part color at three different physical positions, all of which are directly under the color sensor.

At this point the three values are averaged and the highest sampled value is removed to eliminate any errantly high random values; this keeps a consistently predictable numeric value and color reporting. Once the color is properly reported to the control the conveyor then shuttles the part to one of three part spurs, spur #1 is red, spur #2 is white and spur #3 is blue. When a color is detected we CMD a pneumatic cylinder to actuate, this in turn will push the part into the appropriate spur based on its color.

Once the part is been pushed into the spur a photo eye is actuated and the color sorters AB Micro 850 sends command data to the Robot Stations Micro850 via an Ethernet MSG CIP message instruction. The following describes the transmitted binary value for each of the colors: The value '1' for a RED part, the value '2' for a WHITE part and the value '4 for a BLUE part. It should be noted that the RED part has priority to be picked up over the other colors if more than one part is present, then next priority is the white part and the lowest priority is the blue part. Once a value has been sent the robot will now empty the spur for the color or colors that were reported and transport the part to the rotary index table for final stacking. This completes the cycle.

In another sorting embodiment, a Sequence of Operations for the robot station 112 to unload the parts to an error checking color sorting station include the steps of: Rotary Axis is CMD Counter Clock Wise or 'CCW' to the active part color location for pickup position which is determined by software "SW" range or SW stop limit, and then stop. Horizontal axis CMD FWD until its SW stop limit. Vertical axis CMD down to its SW stop limit.

CMD the air compressor on, this step creates a vacuum through the use of a double cylinder configuration, one cylinder is pressurized and the other creates a vacuum based on the first cylinders motion, the cylinders are mechanically coupled together. This will be used by the robot vacuum end effector to pick up the part which is described in the next step. Vacuum valve on, part is secured to Robots end effector. Vertical axis CMD up until it actuates its Reference/Returned limit switch position. Horizontal axis FWD until its SW stop limit is reached. Rotary Axis is CMD Clock Wise or 'CW' until its SW stop limit is reached then it stops, this places the Robot in position to unload the part once the Rotary Indexing table is in position. Based on the color that's being called for pick up the Rotary indexing table will position itself to the appropriate color location and then stop. Vertical axis CMD down until its SW stop limit, which places the part on the rotary table. Vertical axis CMD up until it actuates its Reference/Returned limit switch position. Horizontal axis CMD backward until it actuates its Reference/Returned limit switch position. The robot is now return to its Reference position and awaits its next CMD.

Once the error checking color sorting station has a part ready for pickup it's AB Micro 850 sends command data to the Robot Micro850 VIA an Ethernet MSG CIP message instruction. The data is coded in binary and is as follows— The value '1' for a RED part, the value '2' for a WHITE part and the value '4 for a BLUE part. It should be noted that the RED part has priority to be picked up over the other colors if more than one part is present, then next priority is the white part and the lowest priority is the blue part. In this case there is no corresponding "Handshake" of data from the robot station to the error checking color sorting station.

It is significant to note that the error checking color sorting station has priority over the warehouse station for part handling. In this manner, the robot station 112 unloads the color sorter even if the warehouse station has a part ready for pickup.

Figure 3B:
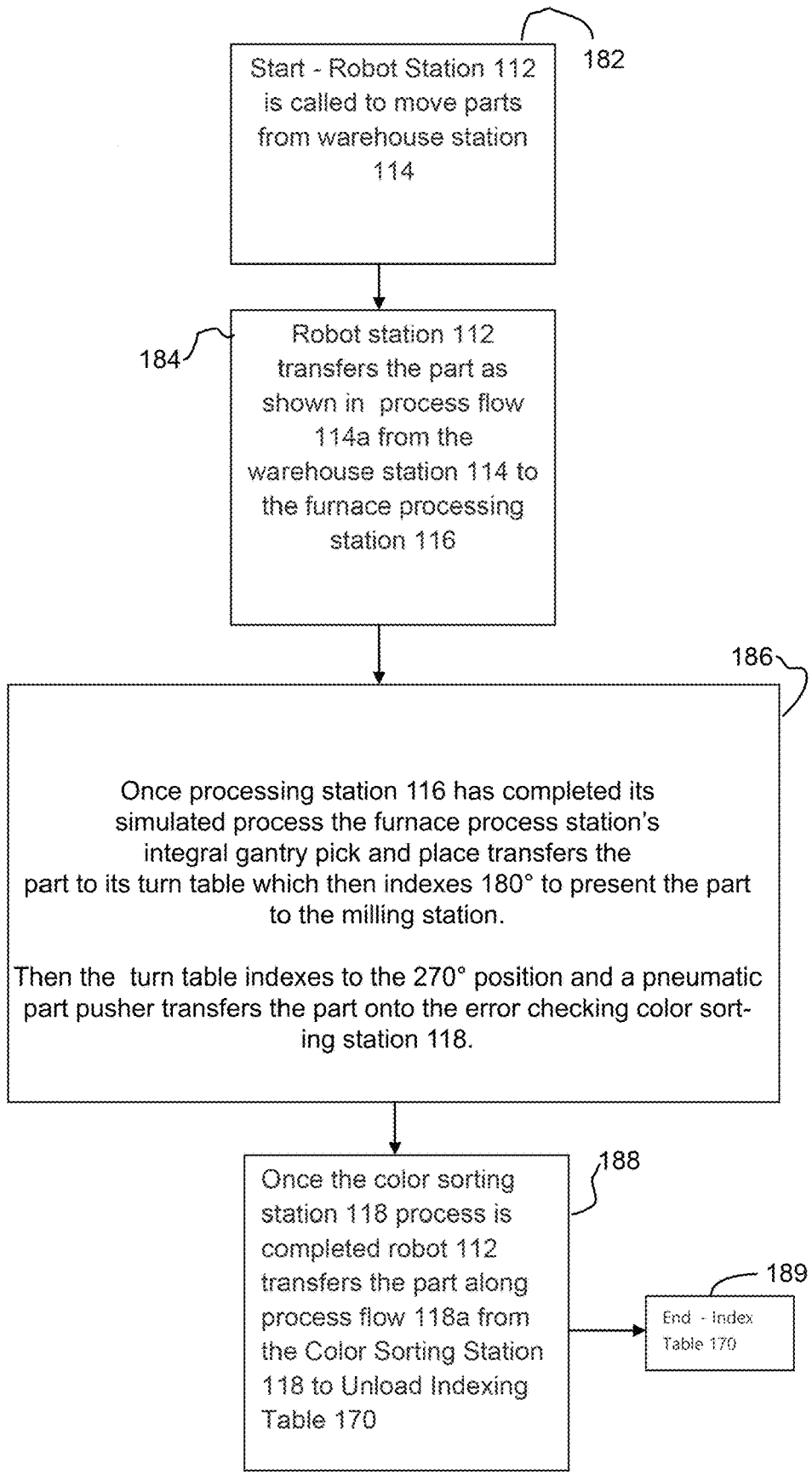
FIG. 3B illustrates a flow chart of an exemplary part process flow automation-driven process, in accordance with an embodiment of the present disclosure.

FIG. 3B illustrates a flow chart of an exemplary part process flow automation-driven process, in accordance with an embodiment of the present disclosure. In step 182 robot station 112 is called to move parts from warehouse station 114. In step 184 robot station 112 transfers the part as shown in process flow 114a from warehouse station 114 to the furnace processing station 116.

In step 186 once processing station 116 has completed its simulated process the furnace process station's integral gantry pick and place transfers the part to its turn table which then indexes 180° to present the part to the milling station. Once this process has been completed the turn table indexes to the 270° position and a pneumatic part pusher transfers the part onto the error checking color sorting station 118 in-feed conveyor along process flow 116a as shown in FIG. 3A. To complete step 186 pneumatic part pusher transfers the part to error checking color sorting station 118. In step 188 after the color sorting station 118 process is completed robot 112 transfers the part along process flow 118a from the color sorting station 118 to unload indexing table 170. The part process flow is at an end at step 189 when the part is placed on the index table 170.

Two Student Work Station Mechatronic Factory Simulation System

Figure 8:
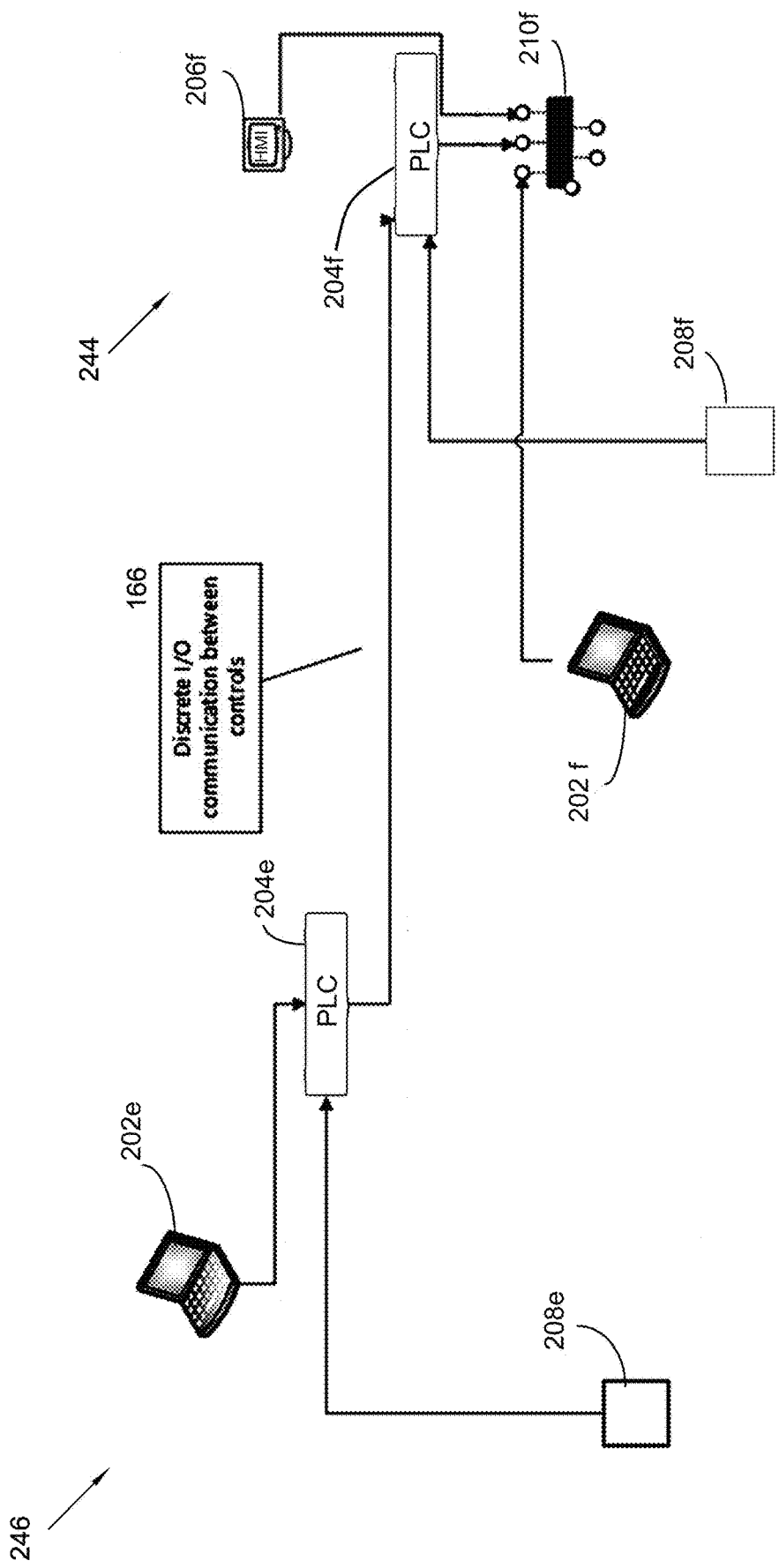
FIG. 8 illustrates a block diagram of an exemplary communication architecture for the two student work station automation-driven process, in accordance with an embodiment of the present disclosure.
Figure 9:
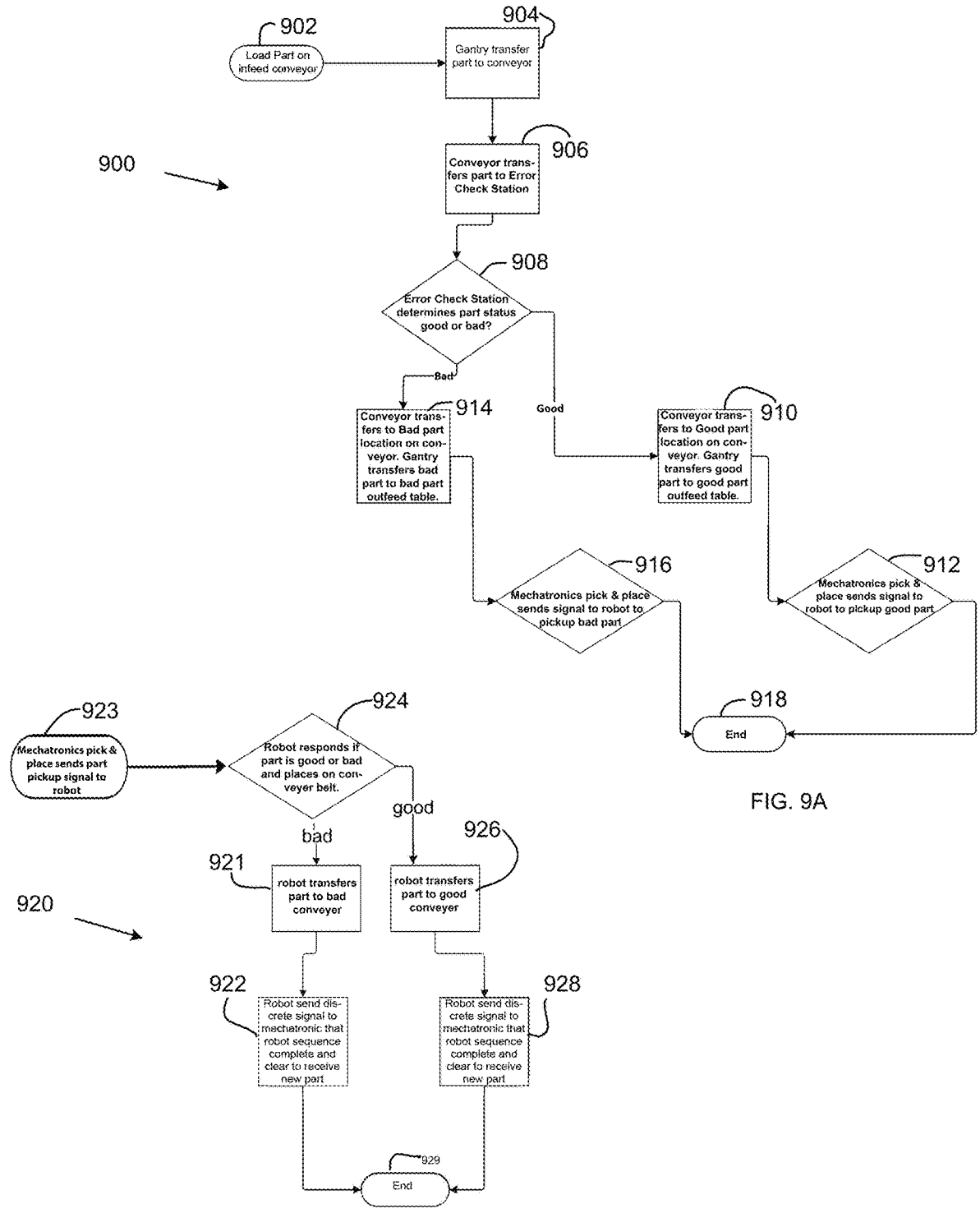
FIG. 9A illustrates a block diagram of an exemplary mechatronic pick and place of the two student work station automation-driven process, in accordance with an embodiment of the present disclosure.
FIG. 9B illustrates a block diagram of an exemplary robot unload station of the two student work station automation-driven process, in accordance with an embodiment of the present disclosure.

The preferred embodiment of the independent control sub-system in the two student work station mechatronic factory simulation system is comprised of an Allen Bradley® Micro 1000 PLC, a CNC Technical Solution custom designed scaled mechatronics' training system as shown in FIGS. 8, 9A and 9B. The mechatronics' training system features a load station, part transfer conveyor, two axis gantry with an electromagnet part end effector; an error check station and a good or bad part unload station.

FIG. 8 illustrates a block diagram of an exemplary communication architecture for the two student work station automation-driven process, in accordance with an embodiment of the present disclosure. The two student independent control sub-systems 246 and 244 provide communication architecture for the automation-driven process. Student work stations include student laptops 202e-f and an Allen Bradley® (AB) 4.3 human machine interface (HMI) 206f that allows student technicians an effective way to monitor, analyze and resolve errors in the automation-driven process, whilst the machine simultaneously feeds back information that aids the student's decision-making process. In addition to analyzing and resolving introduced errors, the student work stations also allow the students to load software and flash firmware to the PLC 204e and PLC 204f, the PLCs are where the code resides to operate the process. 208e-f introduces at least one artificially manufactured error to automation-driven process through the interruption of discrete I/O signals to and from the field devices of the system. Remote control problem interjecting devices 208f located in independent control sub-system 210 sends error interrupt signals to a Robot Station. In this preferred embodiment remote control problem interjecting devices 208f is a RF Controlled 12 channel relay problem injector but other similar interjecting devices that would function to remotely interjecting errors into the system could also be used. In this preferred embodiment the independent control system 210f is a Unmanaged Ethernet Switch but it should be understood by someone with ordinary skill in the art that other similarly situated devices could be used to communicate with other Ethernet switches for connecting Ethernet devices to communicate with each other and to pass MSGCIP commands between controls.

The two student mechatronics pick and place conveyor system with robotic unload utilizes two PLC's that communicate with each other through discrete communication 166. Through discrete communication, the student technicians can learn about the errors that are introduced into the process. Discrete communication 166 utilizes 0 V to represent "off" and 24 V to represent "on" (see FIG. 7).

This two student work station mechatronic factory simulation system introduces students to classic PLC controls systems and allows for structured problem solving and troubleshooting. It is intended to be the next step in a series of building block methods and steps that utilizes the mechatronics system to teach debugging in a complex controls systems.

The mechatronics system can be configured either as a standalone system (Classic discrete I/O) or a Master Slave system used in conjunction with an antonymous Robot acting as a good or bad part transfer mechanism.

In this disclosed learning approach the Mechatronic system starts off as a classic standalone discrete I/O machine and will run independently until configured to operate with the second station which is a Robot offload station.

The independent control sub-system utilizes an Allen Bradley® micro 850 PLC Ethernet based system. It controls the Robot that is responsible for the unloading and part transfer from the mechatronics machine to the Robot good or bad part conveyor system. It too can function independently and is used to teach higher level controls systems which utilizes Ethernet. Once again this allows for a structured problem solving and a high level of troubleshooting experience.

When configured and enabled these two systems can be connected to each other through discrete I/O communications or physical wiring i.e. from the outputs of one control to the inputs of the other and vice versa. This communication allows both two student independent control sub-systems 246 and 244 to pass signals to each other such as: cycle start, robot in collision zones, E-stop, good part or bad part present and the like.

This two student work station mechatronic factory simulation system demonstrates discrete I/O communication methods between scaled model factory station simulator machines and their integral controls and is used as a next step in this disclosed learning method. Once a student has mastered each level of the control system, the student technician is advanced to the four station training system which exclusively deploys the use of Ethernet communication to pass data between the controls (as opposed to discrete communications used in the two station system).

FIG. 9A is a block diagram showing the part process flow of a part through an exemplary two station mechatronic pick and place conveyor system. Mechatronics part process flow 900 initiates by transmitting a discrete signal to robot that commands robot to loads a part on an infeed conveyor in step 902. In step 904 a gantry is used to transfer the parts to a conveyor belt which moves the part to an error check station in step 906. It is significant to note that any discrete signals used in part process flow 900 may be interrupted at any time through a problem injecting device, so as to enable students to identify the control error and resolve the control error. For example, the problem may require the student to identify or diagnose a broken cable.

In one embodiment, a conveyor belt used in step 906 may include two or more pulleys, with an endless loop of carrying medium—the conveyor belt—that rotates about them. In another embodiment, gantry used in step 904 is an electromagnetic end effector to pick up a part and lift the part to a different location.

Next, the conveyor belt used in step 906 transfers the part to an error check station. It is at the error check station that the parts are sorted into good and bad parts. At step 908, a decision is made by the error check station to determine if the part is good or bad. This decision making process may include analysis performed by various sensors, computers, or people. The standard between good or bad parts is predetermined and may be changed.

Upon determination of a good part, at step 910, the conveyor belt used in step 906 transfers a good part through use of the gantry on an outfeed table used in step 910. Next, a mechatronics pick and place system sends discrete signals to the robot to pick up a good part used in step 912. In one exemplary situation, an error may disrupt this discrete signal, at which point the student identifies and resolves the error. Otherwise, the robot proceeds to pick up the good part and load on to the final outfeed table.

In instances where the bad part is moved, a conveyor belt transfers the bad part through use of a gantry to an outfeed table in step 914. Finally, the mechatronics pick and place sends another discrete signal to the robot to pick up a bad part in step 916 for loading on to the final outfeed table. A step 918 ends the process flow 900.

In one exemplary use, in step 906 a conveyor belt and gantry are used together to move parts, through an exemplary automation-driven process. A conveyor belt carries the parts and an electromagnetic gantry picks up the parts. Parts can be placed on conveyor belt used in step 906 and transferred to the error check station. The parts are then checked for potential problems in an error checking station, and separated into good parts and bad parts. The parts are then separated into a bad part position of the bad part outfeed table used in step 914 for holding bad parts, and in step 910 a good part position of the conveyor belt for holding good parts.

Continuing with the two student work station system, FIG. 9B illustrates a block diagram showing robot part process flow 920 of a part by an exemplary robot unload station. The robot unload station includes a robot that helps run the part process 920. Initially, mechatronics pick and place sends discrete signals to the robot used in step 923 to initiate the process. Discrete signals may be interrupted at any time through problem injecting device, so as to enable students to identify and resolves errors.

At step 924, the robot responds to determine if the part is good or bad. As shown in step 926, if the determination is a good part, conveyor used in step 924 transfers the good part to the end of the conveyer and stops. A step 922 includes the robot sending a discrete signal that the robotic sequence is complete and the part is ready for pick up. At step 921, conveyor transfers the bad part to the end of the conveyer and stops. A step 928 includes the robot sending a discrete signal that the robotic sequence is complete and the part is ready for pick up. Through this process, errors can be introduced at any point, and the student technician at the student work station can analyze and resolve the artificially manufactured error. A step 929 ends the process flow 920.

As with the method 100 as seen in FIG. 1, a Step 104 includes preparing software and firmware to provide instructions to the automation-driven process from the multiple student work stations. Prior to operating the method, a learning step includes loading and preparing software and firmware to the logic control system. This is performed from the individual student work stations and for teaching purposes.

For example, in one embodiment, the method includes loading software, from the multiple student work stations, to at least partially initiate the automation-driven process. And further, the method includes flashing a firmware, from the multiple student work stations, to at least partially initiate the automation-driven process. The firmware is defined as an operating system. In essence, firmware is the executive software, behind and not seen.

Figure 7:
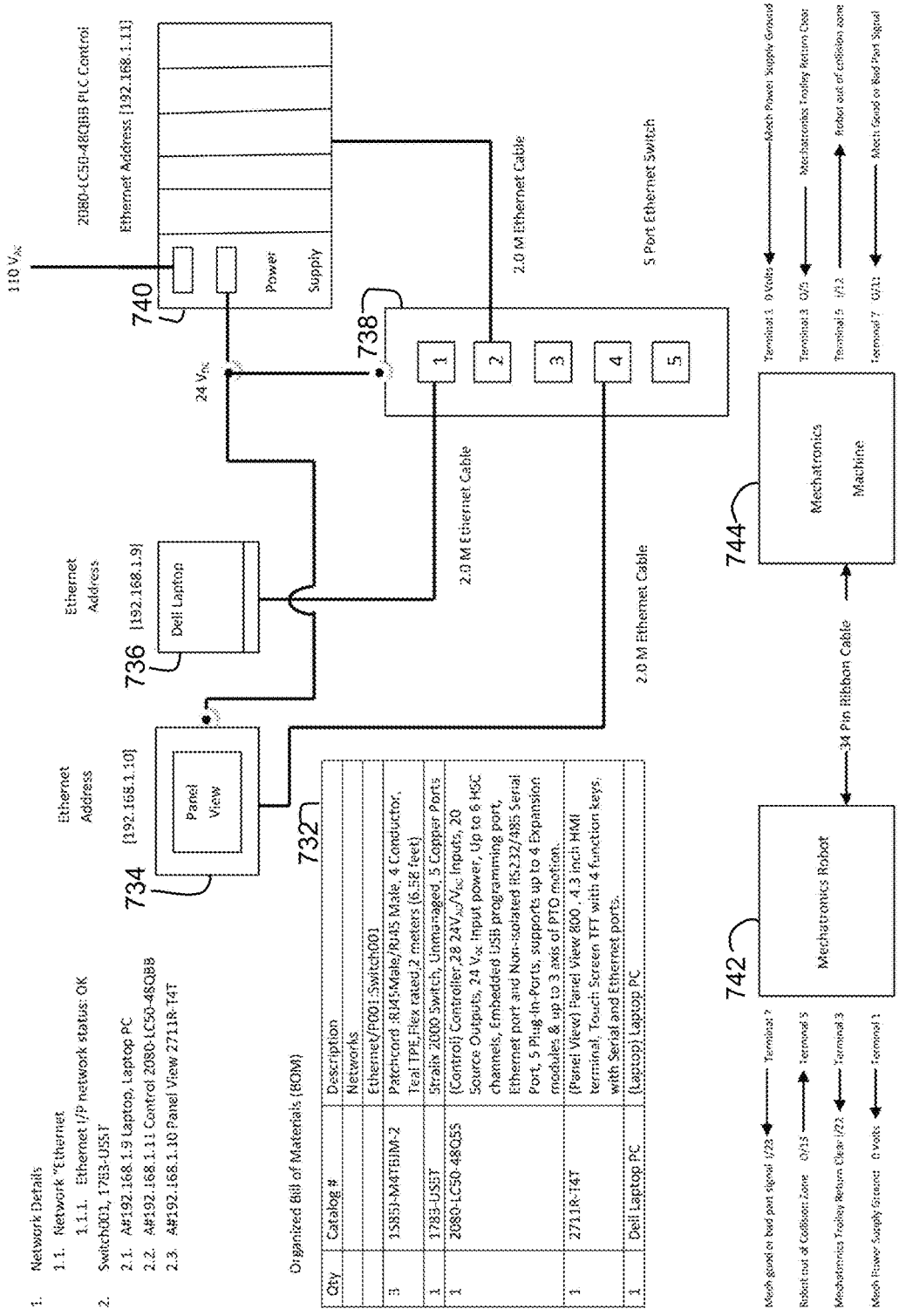
FIG. 7 illustrates a block diagram of an exemplary Ethernet network, in accordance with an embodiment of the present disclosure.

FIG. 7 illustrates a block diagram of an exemplary Ethernet network, in accordance with an embodiment of the present disclosure. In one exemplary embodiment of an Ethernet Based Micro 850 PLC 700 shown in FIG. 7, an organized Bill of Materials 732 lists the part number and description of the parts. A panel view 734 may include an HMI for operating the machine. A laptop 736 may be used to monitor the commands based on the parts listed in the Bill of Materials 732. An Ethernet switch 738 allows Ethernet devices to communicate with each other and to pass MSGCIP commands between controls, and a PLC control 740. A mechatronic machine 744 exchanges commands with the mechatronic robot 742 through a handshake via a 34 pin ribbon cable. PLC 744 is a Micro850 PLC which is where the code resides to operate the process.

Suitcase-Sized Student Workstation Mechatronic and Robotic System

The mechatronics' suitcase system is used to introduce both PLC hardware and PLC software Including the PLC configuration, flashing of firmware, loading of PLC software and the programming of specific instructions and of course communications and control connection techniques to the student. This is a prequel to the student working with the two station and four station mechatronics systems.

Figure 10:
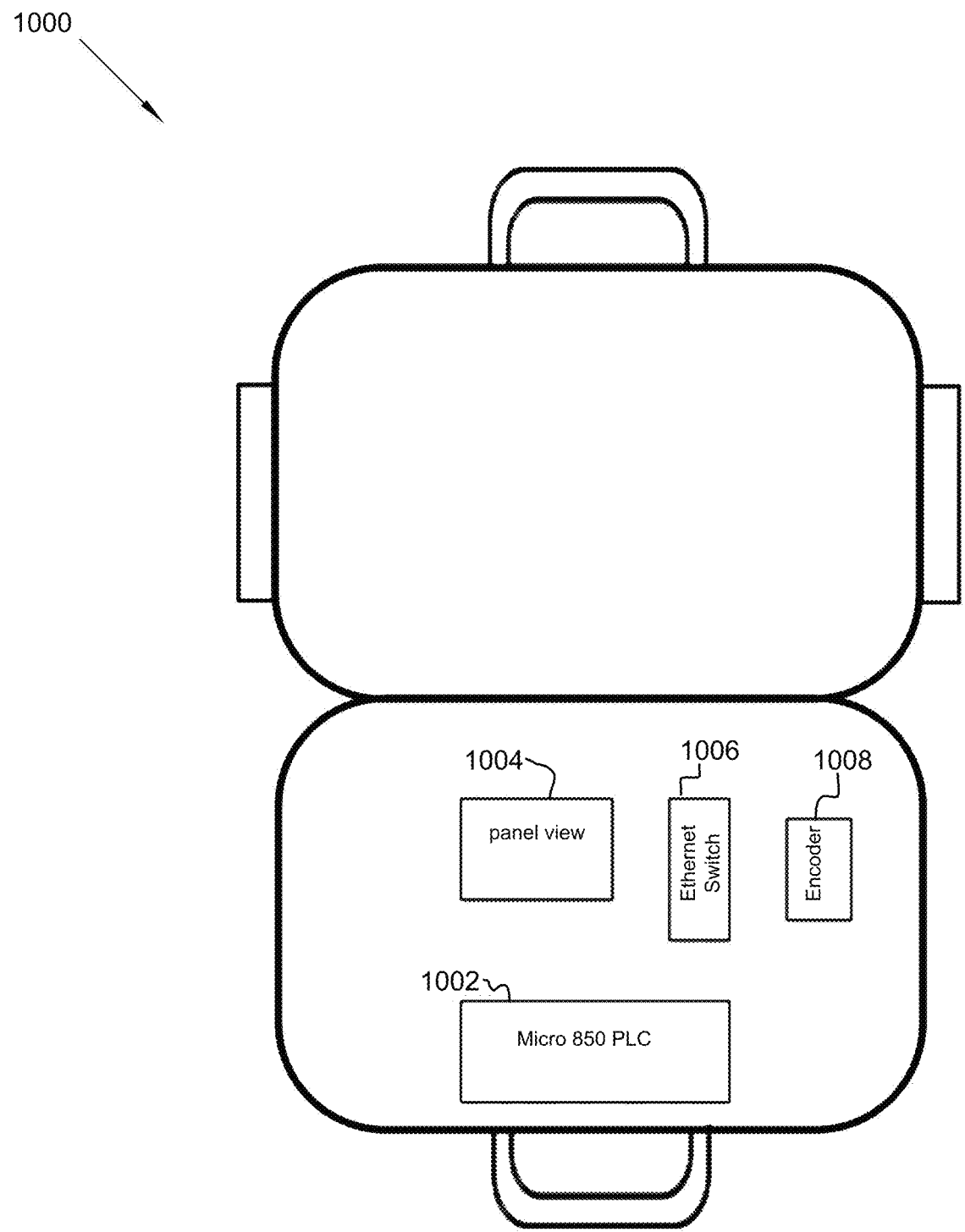
FIG. 10 illustrates a top view of an exemplary suitcase sized student work station, in accordance with an embodiment of the present disclosure.

Turning now to FIG. 10, a suitcase-sized student work station 1000 is used as a precursor learning system whereby the student will learn to configure, flash firmware, load software and create very specific logic in the plc to replicate the system they are about to learn to debug and analyze and resolve the errors in the process in the field. The suitcase-sized student work station 1000 is compact, portable, and allows for students to learn the practical aspects of field student work in mechatronic simulations. In one embodiment, the suitcase-sized student work station 1000 comprises a Programmable Logic Control 1002, a Human Machine Interface 1004, and an Ethernet Switch 1006, as taught above for the standard student work stations. In one embodiment, the suitcase-sized student work station 1000 includes a case with an insulated interior for holding the Programmable Logic Control 1002, Human Machine Interface 1004, an Ethernet Switch 1006, and an encoder 1008.

In one embodiment, the student prepares the software as a separate prequel learning component that requires the student to experience an "out of the box" first time controls configuration experience. The focus of this is to have the student proficient in flashing firmware and loading software on both the Micro 850, panel view 800 and configuring the controls system via internet protocol using the Stratix 2000° 5 port unmanaged switch. This is accomplished by using a custom kitted controls package as shown in FIG. 10.

System 1000 provides methods and techniques that are enhanced through the use of a secondary standalone control system, which are mainly comprised of but not limited to a series of PLC 1002, HMI 1004, multiple Ethernet switches 1006, and Optical Encoders 1008 (FIG. 10). Students load software and flash firmware on this identical off line system as well as configure and manipulate a multi-station Ethernet configuration replicating the system 1000.

In conclusion, mechatronic factory simulation system and method of teaching how to resolve complex control system errors in an automation-driven process while providing structured learning objectives and methods for detecting and resolving errors in a complex PLC automation-driven process. Each system has objective driven learning methods and serve to replicate a scaled factory.

Automation-driven process 120 may include, without limitation, at least one scaled model factory station simulators such as robot station 112, a warehouse station 114, a furnace processing station 116, an error checking color sorting station 118, and an indexing rotary table. The various systems although autonomous in nature are all connected and communicate with each other via an Ethernet ring and pass data and messaging between the student workstations.

At least one remote control problem interjecting device 208a-d introduces at least one artificially manufactured error to automation-driven process 120 through the interruption of discrete I/O signals to and from the field devices of the system 200. As a result of the interruption, the students independently or concurrently, work to identify and resolve the interruption in the automation-driven process with a variety of electrical measurement instruments.

In this manner, the system and method teaches students both theoretical and practical hands on technical knowledge in the practical use and methods of debug and troubleshooting of programmable logic control systems as they apply to the automation-driven mechanical systems they control without having to be at a real factory.

This disclosure paired with its custom training course creates a method of providing and quickly imparting both theoretical and hands on technical knowledge to students as it applies to the practical use of Programmable Logic Control Systems and the mechanical systems they control. This unique method of learning allows the students to delve into PLC functions and how they are integrated into machine. The following areas are emphasized: electrical integration of both the control and field devices, programming methods, mechanical applications, pneumatic and vacuum based applications, and IP based data communications between control systems.

These and other advantages of the disclosure will be further understood and appreciated by those skilled in the art by reference to the following written specification, claims and appended drawings.

Because many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the disclosure should be determined by the appended claims and their legal equivalence.

I claim:

1. A method, comprising:
    connecting multiple programmable logic controlled subsystems to allow a student to detect and resolve errors in an automation-driven process;
    sending a command to and from the multiple programmable logic controls to initiate automatic operation and to display status and fault messaging to resolve errors in the automation-driven process;
    constructing a plurality of factory station simulators, wherein at least one of the plurality of factory station simulators includes at least one simulator moving part, thereby forming at least one moving part factory station simulator, wherein the at least one simulator moving part represents an actual factory moving part;
    joining the plurality of factory station simulators to form a factory simulator;
    connecting each factory station simulator to at least one field device;
    connecting at least one factory station simulator to at least one student workstation;
    sending a signal to the at least one moving part factory station simulator to cause the at least one simulator moving part to move;
    introducing, intentionally, from at least one remote control problem interjecting device, at least one artificially manufactured error command to cause an interruption in the signal to the at least one moving part factory station simulator to cause the at least one simulator moving part to stop moving such that the artificially manufactured error command interrupts the automation-driven process;
    identifying, from the at least one student work station, the interruption in the signal to the at least one moving part factory station simulator;
    resolving, from the at least one student work station, the interruption in the signal to the at least one moving part factory station simulator.

2. The method of claim 1, further comprising sending an Ethernet MSGCIP command to and from the at least one student work station to initiate automatic operation as well as to display status and fault messaging to resolve errors in an operation of the factory simulator.

3. The method of claim 1, further comprising analyzing, from a plurality of student work stations, a type of interruption that has been introduced in the factory simulator.

4. The method of claim 1, further comprising two student work stations.

5. The method of claim 1, further comprising a scaled part handing and sorting system which utilizes an X & Y axis motor-controlled gantry system with an electro magnet end effector for part handling.

6. The method of claim 1, further comprising at least two programmable logic controls for operating the factory simulator.

7. The method of claim 1, further comprising discrete I/O used for communication between at least two student work stations.

8. The method of claim 1, further comprising two problem interjecting devices for introducing multiple errors into both systems in the factory simulator.

9. The method of claim 1, further comprising two laptops for monitoring and analyzing the factory simulator.

10. The method of claim 1, further comprising a step of loading software, from the at least one student work station, to at least partially initiate an automation-driven process.

11. The method of claim 1, wherein the at least one factory station simulator uses pneumatics for a vacuum part lift, a part pushing and placement, and motors with encoder driving lead screws for axis positioning.

12. The method of claim 1, wherein at least one artificially manufactured error interrupts signals to and from the at least one field device going to a programmable logic control.

13. The method of claim 1, further comprising identifying the interruption by using interface software and an electrical measurement instrument.

14. The method of claim 1, further comprising a step of flashing a firmware, from the at least one student work station, to at least partially initiate an automation-driven process.

15. The method of claim 1 wherein the analyzing and the resolving is accomplished through the use of interface software, schematics and electrical measurement instruments.

16. The method of claim 1, wherein the at least one student work station comprises at least one laptop computer and at least one human machine interface.

17. The method of claim 1, wherein a plurality of Programmable Logic Controls send commands via Ethernet MSGCIP messages commands to and from one another to operate an automation-driven process, and further comprises transmitting Ethernet MSGCIP messages command data to specific controls through use of an unmanaged Ethernet switch.

18. The method of claim 1, wherein at least one factory station simulator is at least one of a robot station, a warehouse station, a furnace processing station, and an error checking color sorting station and an index table.

19. A method, comprising:
    connecting multiple programmable logic controlled subsystems to allow a student to detect and resolve errors in an automation-driven process;
    sending a command to and from the multiple programmable logic controls to initiate automatic operation and to display status and fault messaging to resolve errors in the automation-driven process;
    constructing at least one factory station simulator, wherein the at least one factory station simulator includes at least one simulator moving part, wherein the at least one simulator moving part represents an actual factory moving part;
    connecting the at least one factory station simulator to at least one field device;
    connecting the at least one factory station simulator to at least one student workstation;

sending a signal from the at least one field device to the at least one factory station simulator to cause the at least one simulator moving part to move;

introducing, intentionally, from at least one remote control problem interjecting device, at least one artificially manufactured error command to cause an interruption in the signal to the at least one factory station simulator to cause the at least one simulator moving part to stop moving;

identifying, from the at least one student work station, the interruption in the signal to the at least one factory station simulator;

resolving, from the at least one student work station, the interruption in the signal to the at least one factory station simulator; and wherein at least one factory station simulator is at least one of a robot station, a warehouse station, a furnace processing station, and an error checking color sorting station and an index table.

20. A method, comprising:

connecting multiple programmable logic controlled subsystems to allow a student to detect and resolve errors in an automation-driven process;

sending a command to and from the multiple programmable logic controls to initiate automatic operation and to display status and fault messaging to resolve errors in the automation-driven process;

constructing at least one factory station simulator, wherein the at least one factory station simulator includes at least one simulator part, wherein the at least one simulator part represents an actual factory part;

connecting the at least one factory station simulator to at least one field device;

connecting at least one factory station simulator to at least one student workstation;

sending a signal from the at least one field device to the at least one factory station simulator to cause an action by the at least one simulator part;

introducing, intentionally, from at least one remote control problem interjecting device, at least one artificially manufactured error command to cause an interruption in the signal to the at least one factory station simulator to stop the action by the at least one simulator part;

identifying, from the at least one student work station, the interruption in the signal to the at least one factory station simulator;

resolving, from the at least one student work station, the interruption in the signal to the at least one factory station simulator;

wherein at least one factory station simulator is at least one of a robot station, a warehouse station, a furnace processing station, and an error checking color sorting station and an index table; and wherein the analyzing and the resolving is accomplished through the use of interface software, schematics and electrical measurement instruments.

* * * * *